United States Patent [19]

Casutt

[11] 4,141,529

[45] Feb. 27, 1979

[54] BANANA HOLDER

[76] Inventor: Toni Casutt, Kirchweg 46, 8102 Oberengstringen, Switzerland

[21] Appl. No.: 810,739

[22] Filed: Jun. 28, 1977

[30] Foreign Application Priority Data

| | | | |
|---|---|---|---|
| Jul. 6, 1976 | [CH] | Switzerland | 8663/76 |
| Aug. 31, 1976 | [CH] | Switzerland | 11048/76 |

[51] Int. Cl.[2] .......... F16M 13/00

[52] U.S. Cl. .......... 248/359

[58] Field of Search .......... 248/317, 339, 340, 359, 248/360; 223/87, DIG. 1, DIG. 2

[56] References Cited

U.S. PATENT DOCUMENTS

| | | | |
|---|---|---|---|
| 958,687 | 5/1910 | Anderson | 248/317 |
| 1,863,743 | 6/1932 | Burns | 248/340 X |
| 1,972,505 | 9/1934 | Wilson | 248/340 X |
| 2,798,230 | 7/1957 | LeFebvre et al. | 248/311.3 X |
| 3,085,725 | 4/1963 | Caparosa | 223/87 |
| 3,310,272 | 3/1967 | Brunger | 248/339 |
| 3,402,909 | 9/1968 | Ely | 248/317 |
| 3,692,269 | 9/1972 | Hales | 248/339 X |
| 4,023,762 | 5/1977 | Batts | 248/359 |

FOREIGN PATENT DOCUMENTS

| | | | |
|---|---|---|---|
| 1356406 | 2/1964 | France | 248/340 |
| 381962 | 11/1964 | Switzerland | 248/340 |

*Primary Examiner*—William H. Schultz
*Attorney, Agent, or Firm*—Flynn & Frishauf

[57] ABSTRACT

A flat body portion of a holder for bunched bananas is suitable for application of a label and is suspended by an upper hook. Flexible arms extend downward from the body portion and each carries a barb or a cross arm at its extremity. In the case of a cross arm, in the unloaded condition, it hangs obliquely to facilitate insertion into a banana bunch. After insertion of the arms into the banana bunch, the arms are bent, so that the cross arms approach a horizontal position and support several bananas of the bunch, distributing the support, to avoid dropping the bunch by the breaking off of a single banana.

11 Claims, 6 Drawing Figures

BANANA HOLDER

This invention relates to a banana bunch holder having a hook for suspending the holder, a body portion suitable for application of a label and appendages for hooking into the bananas of a bunch.

In banana holders heretofore known for hanging banana bunches for retail sale, the holder was always slung around a single banana. There was a disadvantage that this banana could break off under the weight of the whole banana bunch. Furthermore, putting in place the runner or loop of such a banana holder in the banana bunch was rather bothersome.

It is an object of the present invention to provide a banana holder that is particularly easy to hook into a banana bunch and that results in distributing the weight of the banana bunch over several points or locations of support. It is a further object of the invention that such a banana holder should lend itself to production in quantity at the lowest possible expense and should be easy to stack in supply packages or dispensers.

SUMMARY OF THE INVENTION

Briefly, at least two flexible arms are provided extending downward from the label-bearing body portion of a banana holder, each flexible arm having at its end a cross arm or a barb that is designed to grasp into a banana bunch in the neighborhood of the region where the banana stems join together, and the flexibility of the arms is such that the change to their shape under the weight of the banana bunch so that the cross arms or barbs thereafter take a transverse position gripping under a plurality of bananas of the bunch. Above the body portion of the hanger is, of course, an upwardly extending hook for suspending the holder and the banana bunch.

In this manner, it is possible to provide a banana holder that is easily and quickly hooked into a banana bunch and supports the banana bunch at several places, thus distributing the weight when it is hooked in. The flexible parts also adjust themselves well to unevenly grown banana ends or stems. Furthermore, the banana holder of the present invention can be readily manufactured in quantity out of synthetic resin by injection molding with relatively little using up of material. Finally, as the result of its flat form, it can be stacked easily in magazine racks or containers.

The invention is further described by way of illustrative examples, with reference to the annexed drawings, in which.

Figure 1:
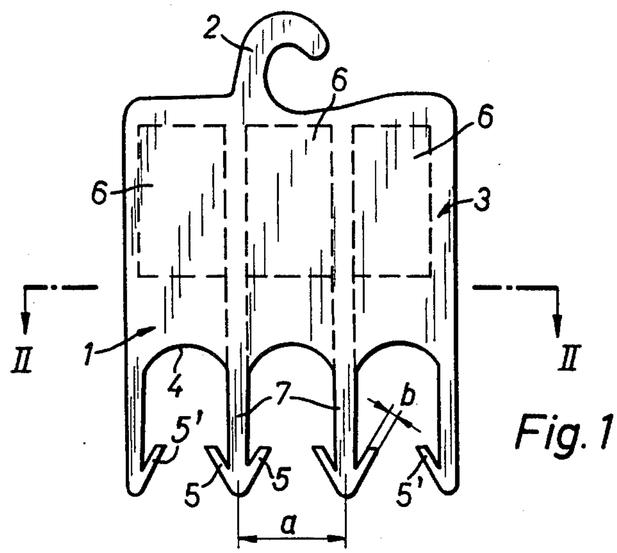
FIG. 1 is a front view of a first embodiment of a banana holder according to the present invention.

The banana holder 1 of FIGS. 1 and 2 includes a suspension hook 2 at the top, a body portion 3 of a configuration suitable for application of a label, located below the hook 2, and, in its lowest portion, several elastically flexible arms 7 extending downward from the body portion 3. These arms 7 run parallel to each other, or more or less so, and each has a barb 5, 5′ at its lower end designed to be hooked into a banana bunch near the place where the bananas are naturally joined together. The label-carrying body portion 3 terminates at its bottom in several approximately semicircular arches 4. The front side of the body portion 3 is flat, for the easier application of a self-sticking price label, while on the back side the arms 7 are continued upward in the form of ribs extending to the upper end of the body portion 3 and, of course, being formed integrally with the flat part of the body portion. The spacing between centers of the flexible arms 7 should be in the range between 15 and 22 mm, preferably about 18 mm.

The stems of the barbs 5 and 5′ are likewise flexible and can lie close along the arms 7 when the banana holder is pushed into a banana bunch from above. The thickness of the arms 7 is greater than twice the stem thickness b of the barb 5. The length of the arms 7 extending below the body portion 3 is at least 20 mm. The two outermost arms 7 carry single inwardly directed barbs 5′, while the remaining arms 7 are provided with double barbs 5. Instead of the four arms 7 illustrated in FIG. 1, a larger or smaller number of such arms 7 could be provided. For reasons of material saving, the body portion 3 could also be made with one or more cavities or apertures 6 indicated by dashed lines in FIG. 1.

The banana holders of all the various embodiments illustrated in the drawings are made in one piece, preferably of a flexible tough thermoplastic synthetic resin. Injection molding with polystyrene as the raw material is particularly preferred for the manufacture of the various illustrated embodiments of banana holders of the present invention.

Figure 3:
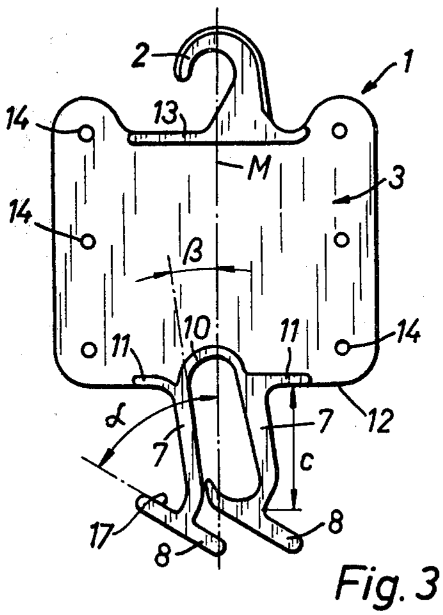
FIG. 3 is a front view of a second preferred embodiment of the banana holder of the present invention.

The banana holder shown in FIGS. 3 and 4 again has a hook 2 above for suspending on a rod or the like and, below it, a body portion 3 suitable for application of a label that carries downwardly extending elastically flexible arms 7. In this case there are two arms 7 running parallel to each other, each carrying at its lower extremity a cross arm 8 designed to be hooked into a banana bunch where the bananas join together in the bunch. Each arm 7 together with its cross arm 8 roughly has the shape of an upside-down T, which is however skewed as presently further described, all essentially in the principal plane of the flat body portion 3. The main portion of each arm 7 is slightly inclined, by an angle $\beta$ of about 10°, with respect to the vertical median M through the body portion 3 of the hanger. The cross arms 8 are disposed at an angle $\alpha$ of about 60° to the vertical median M and at an angle $\alpha - \beta$ of about 50° to the main portion of the arms 7. As shown in FIG. 3, the tip ends of the arms 7 are bent around a little to meet the middle of the cross arms 8 more or less perpendicularly. The two cross arms 8 run parallel to each other and almost touch each other. In fact, at the nearest approach location, where a cross arm end is near the knee of an adjacent arm 7, the cross arm end is turned up slightly in the particular embodiment shown, illustrating the kind of variation in detail which may usefully be provided.

After insertion of the holder of FIG. 3 in a banana bunch, the holder is pulled back by the hook 2. The flexibility of the arms 7 at the transition to the cross arms 8 is such that the previously obliquely directed or crooked arms are stretched by the weight of the banana bunch, causing the cross arms 8 to swing in their orientation as the arm ends bend towards a horizontal position, so that they then grip several bananas from below. The bending of the arms 7 is produced in the principal plane through the flat body portion 3.

The arms 7 have their upper extremities integrally joined to reinforcing ribs 10 and 11. The reinforcing rib 10 runs more or less semicircularly on the flat face of the body portion 3 to connect the two arms 7. The two outer reinforcing ribs 11 run for a distance along the bottom edge 12 of the body portion 3.

Another reinforcing rib 13 is provided at the junction of the suspension hook 2 and the upper part of the body portion 3, running along part of the upper edge of the body portion 3 and hence substantially parallel to the reinforcing rib 11.

A number of warts 14 are provided on the side of the body portion 3 of the hanger on which the reinforcing ribs 10, 11 and 13 are formed, in order to enable the banana holders to be stacked flat one on another. The provision of the ribs and warts makes it possible to make the rest of the body portion 3 very thin in order to save material. A label, for example a self-sticking price label, can be applied on either of the broad sides of the body portion 3.

Figure 5:
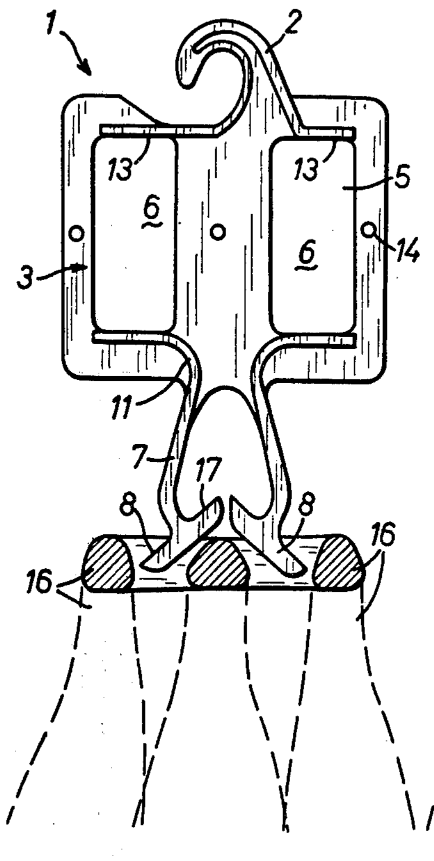
FIG. 5 is a front view of a third embodiment of the banana holder of the present invention, prior to insertion into a banana bunch.
Figure 6:
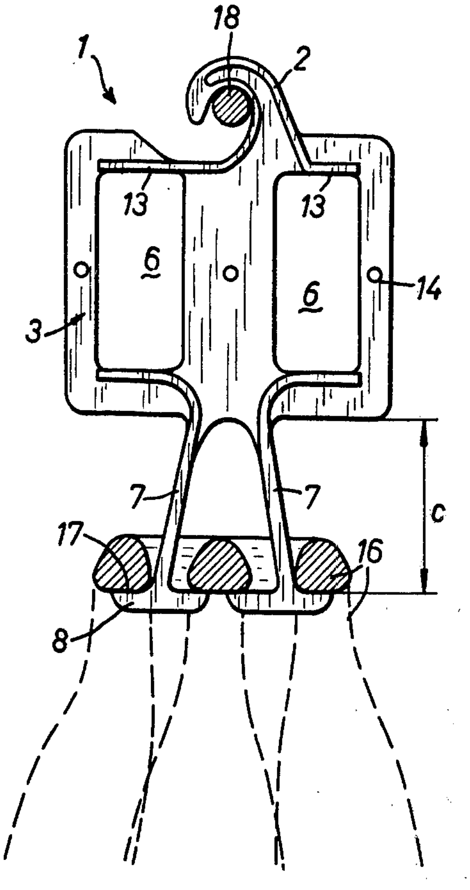
FIG. 6 is a front view of the banana holder of FIG. 5 after insertion in a banana bunch.

FIGS. 5 and 6 show a still different embodiment of a banana holder according to the present invention. In this case, the two cross arms 8 of a pair of arms 7 are, in their unloaded rest position, inclined to each other in a roof-like configuration, before the banana holder is hooked into a banana bunch 16. The two arms 7 of the pair diverge in their respective main portions extending from the bottom of the body portion 3 and converge in their tip portions adjoining the cross arms 8. The "roof" angle between the cross arms should be between 70° and 110° and is preferably about 90°, as shown. In the unstressed condition, the upper ends of the cross arms 8 are separated from each other only by a narrow gap. The arms 7 are flexible so that when the banana holder is pushed into a banana bunch 16, the cross arms 8 can penetrate below the closely spaced banana ends near where they are grown together and grasp below them, as shown in FIG. 6. When the banana holder is suspended on a rod 18, the arms 7 are stretched straight by the weight and the supporting surfaces 17 of the cross arms 8 run approximately parallel and are located approximately in a common horizontal plane.

Although the invention has been described with reference to particular illustrative embodiments, it is evident that variations and modifications may be made within the inventive concept, including, but not limited to, the provision of a feature of one illustrated embodiment in another illustrated embodiment. For example, in the embodiment of FIG. 5 and FIG. 6, and likewise in the embodiment of FIGS. 3 and 4, more than two arms 7 could be provided.

Figure 2:
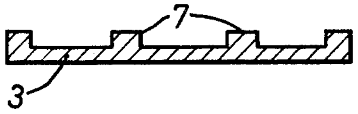
FIG. 2 is a section through the banana holder of FIG. 1 on a plane through the line II—II of FIG. 1.
Figure 4:
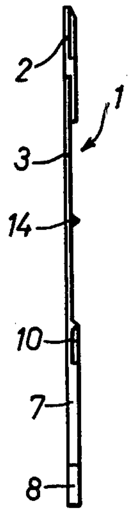
FIG. 4 is a side view of the banana holder of FIG. 3.

It should be noted that although the middle arms 7 of the banana holder of FIG. 1 would not be bent out of shape by a balanced downward pull, the loads applied to the respective arms 7 through the barbs 5, 5' will generally have some unevenness and the arms 7 will bend one way or another to adapt to the load, so that it is importand also in the embodiment of FIG. 1 that the arms 7 should be flexible. In the embodiments of FIGS. 3 and 4 and of FIGS. 5 and 6, the cross arms may be not more flexible than the arms 7 or even somewhat less flexible than the arms 7, in contrast to the case of FIGS. 1 and 2 as to which it was mentioned above that the barbs 5 are of smaller cross section than the arms 7 and hence somewhat more flexible.

I claim:

1. A banana holder made in one piece of synthetic plastic comprising, in combination:
- a flat body portion (3) having a labelling surface;
- a hook (2) for hanging the holder and its load, said hook extending upward from said body portion (3);
- a plurality of flexible arms (7) spaced from each other and extending downward from said body portion (3) being flexible at least in the region of their downward ends, and
- a cross arm (8) at the downward end of each of said flexible arms (7) for grasping into a banana bunch near the region (16) thereof in which the banana stems have grown together,
- said downward ends of said flexible arms (7) and the respective junctions with said cross-arms (8) being so shaped that said cross-arms are oblique to the general direction of said flexible arms (7) in the unloaded condition of the banana holder, and
- the flexibility of said flexible arms (7) or said barbs being sufficient to change the shape of said flexible arms so as to bring said cross-arms into substantially horizontal orientation under the weight of a banana bunch after insertion of said cross-arms and flexible arms into said banana bunch.

2. A banana holder as defined in claim 1, in which said flexible arms (7) in their unloaded condition run parallel or approximately parallel to each other.

3. A banana holder as defined in claim 2, in which said flexible arms (7), in the unloaded condition, run obliquely to the vertical median line (M) of the holder.

4. A banana holder as defined in claim 3, in which the flexible arms (7) are bent near their lower ends to provide a short portion inclined oppositely to the main portion of said arms with respect to said median line.

5. A banana holder as defined in claim 1, in which said flexible arms (7) connect integrally with reinforcing ribs (10,11) located in the bottom region of said body portion (3) of the holder.

6. A banana holder as defined in claim 1, in which said body portion (3) is provided with at least two material-saving lateral openings (6).

7. A banana holder as defined in claim 1, in which said hook (2) for suspending the holder connects integrally to a reinforcing rib (13) in the upper region of said body portion (3) of said holder.

8. A banana holder as defined in claim 3, in which the inclination angle ($\beta$) of said flexible arms (7) to said vertical median (M) in the unloaded condition is not less than 7° nor more than 13°, in which, further, each of said arms terminates in a short reversely inclined end portion carrying a cross arm (8), in which further the inclination angle ($\alpha$) of said cross arms (8) to said vertical median (M) is not less than 50° nor more than 70°, and in which the spacing (c) between the place of attachment of each cross arm (8) to the bottom edge (12) of said body portion (3) is not less than 15 mm nor more than 25 mm.

9. A banana holder as defined in claim 8, in which said inclination angles ($\beta$,$\alpha$) and spacing (c) are respectively about 10°, about 60° and about 20 mm.

10. A banana holder as defined in claim 1, in which said body portion (3) has a thickness that is smaller than that of said flexible arms (7) and that of said cross arms (8).

11. A banana holder as defined in claim 1, in which each of said flexible arms carries a cross arm (8) at its lower extremity, and in which, in the unloaded condition, the cross arms of an adjacent pair of flexible arms form a roof-like inverted V configuration.

* * * * *

UNITED STATES PATENT AND TRADEMARK OFFICE

CERTIFICATE OF CORRECTION

PATENT NO. : 4,141,529

DATED : February 27, 1979

INVENTOR(S) : TONI CASUTT

It is certified that error appears in the above-identified patent and that said Letters Patent are hereby corrected as shown below:

Claim 3 (column 4, line 27):

"as defined in claim 2" should read --as defined in claim 1--.

Signed and Sealed this

*Second* Day of *October 1979*

[SEAL]

*Attest:*

RUTH C. MASON
*Attesting Officer*

LUTRELLE F. PARKER
*Acting Commissioner of Patents and Trademarks*